United States Patent [19]

Hanusa

[11] 4,138,283
[45] Feb. 6, 1979

[54] PROCESS FOR PRODUCING FABRIC-BACKED CUSHIONING MATERIAL

[75] Inventor: Helmut G. Hanusa, Cape Girardeau, Mo.

[73] Assignee: Textron Inc., Providence, R.I.

[21] Appl. No.: 719,414

[22] Filed: Sep. 1, 1976

[51] Int. Cl.² .................. B29C 17/02; B29D 27/04
[52] U.S. Cl. ........................... 156/77; 156/78; 156/79; 156/87; 156/245; 264/46.4; 264/46.7
[58] Field of Search ............ 156/77, 78, 79, 87, 156/242, 245; 264/45.1, 46.4, 46.5, 46.6, 46.7, 41, 45.4, 46.8, 46.9

[56] References Cited

U.S. PATENT DOCUMENTS

| 2,955,972 | 10/1960 | Wintermote et al. | 156/79 |
| 3,210,782 | 10/1965 | Burst et al. | 264/46.7 |
| 3,258,511 | 6/1966 | McGregor | 156/79 |
| 3,273,179 | 9/1966 | Ridenour | 264/46.7 |
| 3,431,331 | 3/1969 | Pincus et al. | 264/46.4 |
| 3,432,583 | 3/1969 | Robertson | 264/46.4 |
| 3,464,872 | 9/1969 | Everett | 264/46.4 |
| 3,493,449 | 2/1970 | Krug | 156/79 |
| 3,772,111 | 11/1973 | Ginsburg | 156/78 |
| 3,976,731 | 8/1976 | Kapral | 264/46.4 |

Primary Examiner—Caleb Weston
Attorney, Agent, or Firm—Gravely, Lieder & Woodruff

[57] ABSTRACT

A fabric backed cellular cushioning material is produced in a mold by introducing a liquid reaction mixture into a mold cavity and then covering the mold cavity with a coposite material consisting of a fabric backing and a thin layer of preformed cellular material attached to the backing. The preformed cellular material is presented toward the mold cavity. The reaction mixture expands into a cellular cushioning material, which assumes the shape of the cavity, the expansion being sufficient to enable the molded cellular material to completely fill the cavity and diffuse partially into as well as adhere to the preformed cellular material. The air displaced by the expanding reaction mixture passes out of the mold cavity through the preformed layer of cellular material, but once the expanding cellular material reaches the preformed layer, the mold cavity is sealed.

8 Claims, 4 Drawing Figures

PROCESS FOR PRODUCING FABRIC-BACKED CUSHIONING MATERIAL

BACKGROUND OF THE INVENTION

This invention relates in general to cellular material and more particularly to a process for forming a cellular material which is backed by a fabric material.

Foamed or cellular material which is backed by fabric is used quite extensively in the manufacture of automobile seats, its primary advantage being that the fabric backing provides a base to which upholstery material may be stitched or otherwise attached. For example, the cellular material in the seat is normally presented forwardly toward the occupant of the seat and has its forward surface covered with a suitable upholstery material which is drawn rearwardly along the sides of the cellular cushioning material and stitched to the fabric backing which normally projects beyond the cellular material in the form of a lip. Also, when the seat is provided with tufts, more stitching is normally made through the upholstery material and backing material at the creases between adjacent tufts.

For years cushions for seating have been die cut from slab foam which is obtained from a continuous casting operation and has a fabric backing attached to it with an adhesive. Once cut, the fabric-backed cushion usually undergoes skiving and slotting operations to provide it with the desired shape. These operations results in substantial waste and require considerable labor. Consequently, they are expensive. Furthermore, the shapes one can obtain from such operations are normally limited to parallel grooves, radii, and the like, since to obtain even a limited measure of efficiency, the cellular cushion or the slab from which it is cut must pass along a conveyor as the various shapes are cut into it. In other words, the shapes will correspond in direction to the direction in which the cushion or slab is advanced on the processing conveyor as the shapes are cut into it. Moreover, the lip, being pure fabric, is quite limp and therefore is difficult to position for sewing and other operations.

Intricate configurations may be created by molding the cellular material to the desired shape in a closed mold. However, all attempts by applicant to mold the cellular material against the fabric left the interstices of the fabric backing filled with a layer of cellular material of considerably greater density than the remainder of the material. This high density layer existed on both sides of the fabric since the foam material actually penetrated the fabric upon foaming against it. As a result the fabric-backed foam material was difficult to slide across sewing and other handling tables.

To increase the rigidity of the lip applicant attempted to mold a thin layer of foam contemporaneously with the molding of the major portion of the cushioning material. However, the foam material densified in the thin portion of the mold cavity, rendering the lip extremely difficult to pierce with sewing machine needles.

Also the dense layer of foam at the lip did not meet flame retardant requirements, even when large amounts of flame retardants were incorporated into the foam. In this regard the dense foam of relatively thin cross section tends to burn quite readily with the fabric acting as a wick.

Finally it should be noted that the dense foam of the lip will not absorb enough liquid palstisol to enable a vinyl cover to be heat sealed to the lip, thus leaving stitching as the only method of securing the upholstery, but stitching is, as previously mentioned, a difficult procedure due to the high friction which develops between the sewing machine needles and the high density foam.

SUMMARY OF THE INVENTION

One of the principal objects of the present invention is to provide a process for producing fabric-backed cushioning material from cellular material, with the cellular material being molded to the desired shape. Another object is to provide a process of the type stated in which the molded cellular material does not penetrate the fabric backing nor densify at the fabric backing. A further object is to provide a process of the type stated which results in a cushioning material having uniform density and good surface characteristics. An additional object is to provide a process of the type stated which produces a cushioning material having a lip which is relatively firm and is easily penetrated by sewing machine needles. Still another object is to provide a process of the type stated in which the lip will absorb a sufficient quantity plastisol to enable it to be heat sealed to vinyl.

The present invention is embodied in a process for producing a cushion and that process includes introducing a liquid reaction mixture into a mold cavity, covering the mold cavity with a thin layer of preformed cellular material, allowing the reaction mixture to expand in the mold while at the same time venting the mold through the preformed cellular material which has been backed by fabric. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
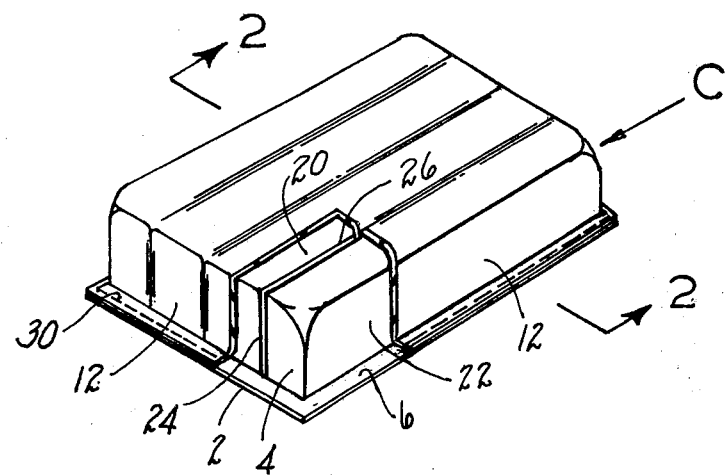
FIG. 1 is a perspective view of a cushion constructed in accordance with the present invention, with the upholstery material of the cushion being partially cut away.
Figure 2:
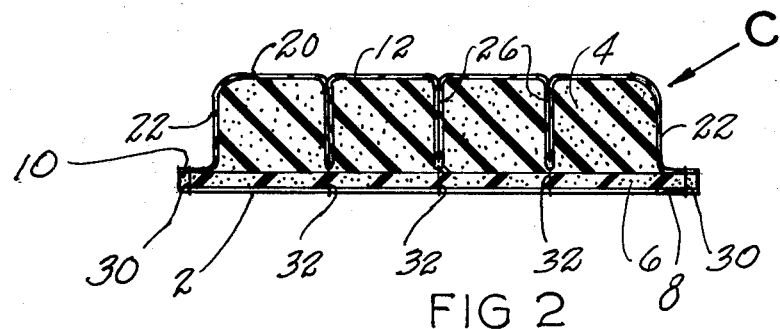
FIG. 2 is a section view of the cushion taken along line 2—2 of FIG. 1.

Referring now to the drawings, a cushion C (FIGS. 1 & 2) is a composite article, the principal components of which are a thin composite backing 2 and a molded cellular cushioning material 4 attached to the backing 2. The composite backing 2 in turn consists of a thin preformed layer 6 of cellular material, called slit foam, and a fabric 8 which is attached to the layer 6 by a suitable adhesive. The preformed layer 6 faces the cellular material 4 which is adhered to it as well as diffused into its interstices. The fabric 8 is thus presented away from the molded cushioning material 4. The composite backing 2 projects beyond the cellular cushioning material in the form of a lip 10. The cellular cushioning material 4 is covered with a suitable upholstery material 12 which may be attached to the lip 10.

The cellular cushioning material 4 is substantially thicker than the layer 6 of slit foam and in its usual form will have a front surface 20, side surface 22, and end surfaces 24. The material 4 may be provided with grooves 26 which open out of the front surface 20 and further may be contoured. The grooves 26 need not be parallel and the contours may be of a compound nature which are incapable of being produced with normal cutting equipment. The side surfaces 22 and the end surfaces 24 are set inwardly from the peripheral margin of the composite layer 2. Thus, the composite layer 2 projects beyond the side surfaces 22 and the end surfaces 24 of the molded cellular material 4 to form the lip 10. The upholstery material 12 extends not only over front surface 20 of the cellular material 4, but also rearwardly along the side and end surfaces 22 and 24. It may be secured to the peripheral lip 10 of the composite backing 2 by stitching 30. At the front surface 20 of the cellular material 4, the upholstery material 12 may be extended into the grooves 26, and at the bottom of the grooves 26 may be further secured to the fabric backing 2 by additional stitching 32.

The fabric 8 may be just about any fabric. It makes little difference whether that fabric is woven or nonwoven or whether it is porous or nonporous. The layer 6 of slit foam may be polyurethane or any other foam material which is compatible with the cellular cushioning material 4. It should be about 1/16 inch to ½ inch in thickness and should have a density ranging between 1 and 3 lbs/ft$^3$. It should further be of the open cell variety so that air is capable of passing through it. Normally, the layer 6 of slit foam is derived by slitting thin segments from a larger slab which has been cast in a conventional conveyor-type bun mold. The fabric 8 is then applied to the slit foam layer 6 by an adhesive, and the composite so formed is die cut to the desired shape, thus forming the composite backing 2. During the die cutting operation relatively small holes 34 (FIG. 4) are punched into the composite backing 2.

Figure 3:
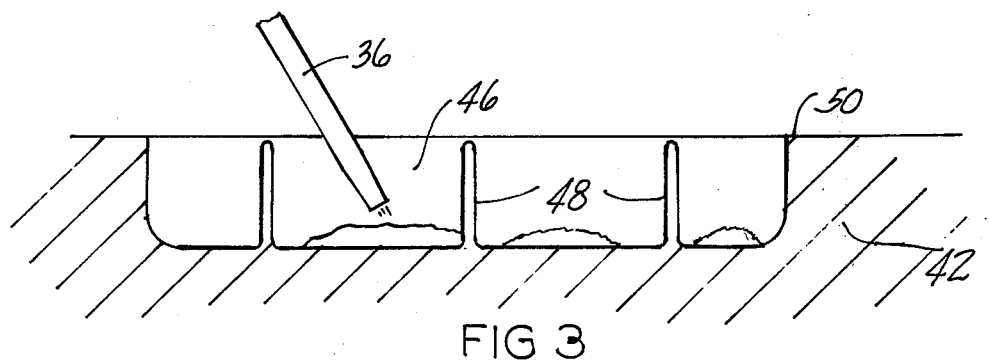
FIG. 3 is a sectional view of a mold having a liquid reaction mixture introduced into it.

The cellular cushioning material 4 is derived from a liquid reaction mixture composed of suitable precursors which are mixed together in a nozzle 36 (FIG. 3). The liquid reaction mixture, a few seconds after the precursors are mixed, begins to cream and rise into a foam. It may be one of many foam compositions, polyurethane being perhaps the most common. Furthermore, the formulation should be such that the cellular cushioning material has a high degree of flexibility so as to have good cushioning properties.

Figure 4:
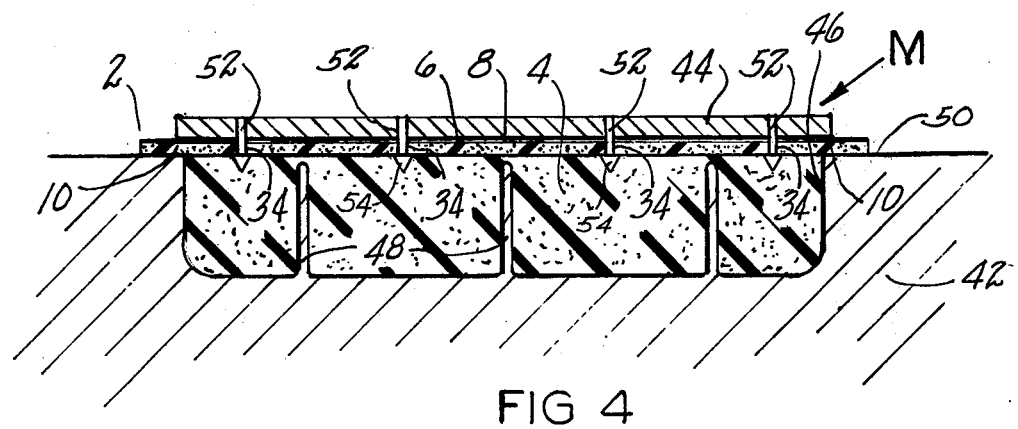
FIG. 4 is a sectional view of the mold in its closed condition with the reaction mixture expanded into a molded cellular material.

The cellular cushioning material 4 is produced in and secured to the layer 6 of slit foam in a mold M (FIGS. 3 & 4) which includes a base 42 and a cover plate 44 (FIG. 4). The base 42 contains a mold cavity 46 which possesses the shape of the cellular cushioning material 4. In particular, the bottom wall of the mold cavity 46 has the configuration of the front surface 20 of the cellular material 4, whereas the side walls of the cavity 46 conform to the contour of the side and end surfaces 22 and 24 of the mold cavity 46. To provide the grooves 26, the bottom wall of the mold cavity 46 has fins 48 projected from it. The base 42 has an upper surface 50 which surrounds the mold cavity 46. This surface is normally planar, but it need not be.

The cover plate 44 is large enough to completely cover the upper end of the mold cavity 46, and furthermore overlie the portion of the upper surface 48 which is located immediately outwardly from the margin of the mold cavity 46. It further has mounting pins 52 (FIG. 4) projected from it, with the pins being arranged in the same pattern and with the same spacing as the holes 34 which are die cut in the composite backing 2. The pins 52 have enlarged heads 54 which are tapered.

To produce the cushion C, the cover plate 44 is removed from the base 42 of the mold M and turned upside down. Then the composite backing 2 is placed over the plate 44 with the fabric 8 presented toward the plate 44 and the holes 34 in registration with the pins 52. The backing 2 is forced downwardly over the heads 54 until the heads 54 pass completely through the backing 2. Next the nozzle 36 is directed into the mold cavity 46 (FIG. 3) so as to introduce the liquid reaction mixture into the mold cavity 46, the amount of mixture being sufficient to completely fill the cavity 46 after the mixture foams to its fullest extent. The mixture of course is composed of precursors which are mixed in the nozzle 36 and upon entering the cavity 46 flow over the bottom surface. In the short interval before the reaction mixture beings to cream, the cover plate 44, having the composite backing 2 attached to it at the pins 54, is placed over the open end of the cavity 42 with the layer 6 of slit foam presented toward the cavity 42. The composite backing 2 possesses a greater surface area than the cross-sectional area of the cavity 46 at its open end, and accordingly the portion of the layer 6 immediately inwardly from the periphery thereof will lie against the upper surface 50 of the mold base 42. In some instances, it is desirable to have the lip 10 on only one or two sides of the cushioning material 4, in which case the composite layer 2 will align with some of the edges of the cavity 46.

The liquid reaction mixture in the mold cavity 46 begins to cream or expand and in so doing rises within the mold cavity 46. Indeed, the resulting foam extends all the way up to the slit foam layer 6 and in so doing assumes the contour of the mold cavity 46 (FIG. 4). As the reaction mixture rises the air ahead of it escapes from the mold cavity 46 through the layer 6 of slit foam. In other words, the layer 6 of slit foam serves as a vent for venting the mold cavity 46. The creaming reaction mixture expands far enough to contact and partially diffuse into the slit foam layer 6, and when this occurs, some of the open cells of the slit foam layer 6 become clogged. Consequently, the mold M seals at the instant it is completely filled. Not only does the expanding reaction mixture diffuse into the slit foam layer 6, but the mixture is sticky in its own right and consequently adheres to the slit foam layer 6 as well. The foam material, however, does not completely penetrate the slit foam layer 6 and consequently it does not reach the fabric 8. Hence, the back face of the composite backing 2 is not coated with the high friction cellular material, and the cushion C slides easily over sewing tables. Furthermore, the foam material does not diffuse into the portion of the slit foam layer 6 which overlies the upper surface 50 of the mold M so that no difficulty is encountered in making the stitching 30.

The lip 10 serves as a convenient appendage for attaching the upholstery covering material 12 to the cellular cushioning material 4. In this regard, the upholstery material 12 is normally preshaped to conform to the configuration of the molded cushioning material 4 and is then placed over cushioning material 4 and attached to the lip 10. If the upholstery material 12 is vinyl, which is often employed for automobile upholstery, a flat vinyl sheet is placed over a heated die cavity possessing substantially the same shape as the molded cushioning material 4, and then a vacuum is created in the cavity to draw the vinyl sheet into it. The heat enables the vinyl to easily deform and assume the configuration of the cavity. The deformation is of a permanent nature, so that when the vinyl is withdrawn from the cavity it remains in the shape to which it was deformed.

Since the lip 10 is nothing more than the thin slit foam layer 6 and fabric 8 adhered to it, the lip 8 is easily penetrated by sewing machine needles. In other words, high friction does not develop because the slit foam layer 6 at the lip 8 has low density. In spite of its low density, the slit foam layer 6 provides the lip 10 with sufficient rigidity or firmness to enable it to stand out from the side and end surfaces 22 and 24 of the cushioning material 4 so as to be easily gripped for stitching purposes.

While the lip 10 is ideally suited for sewing operations, it is equally acceptable for securing an upholstery material 12 such as vinyl by heat sealing. Again, the advantage derives from the low density of the slit foam layer 6 and its large volume of open cells. It will be recalled, that attempts to mold the lips integral with the cushioning material 4 resulted in lips having extremely high density. As a result, the lips were uncapable of absorbing enough liquid plastisol to form an adequate bond between the vinyl upholstery material 12 and the lip. In contrast, the slit foam layer 6 of the lip 10 is low in density and extremely porous due to its open cells. In particular, in this instance the slit foam layer 6, should have a density ranging between 1 and 3 lbs/ft$^3$. Accordingly the layer 6 absorbs a large amount of vinyl plastisol in liquid form. The plastisol is thereafter cured by heating it within the slit foam layer 6.

Once the slit foam layer 6 of the lip 8 has been impregnated with plastisol and the plastisol has been cured, the preshaped vinyl upholstery material 12 is forced over the cushioning material 4. When the vinyl upholstery material 12 is completely in place, its ends will overlie the impregnated lip 10 projected beyond the cushioning material. A dielectric heating element bears against the portion of the vinyl which overlies the lip 10, and this element bonds the vinyl upholstery material 12 to the vinyl within the lip 10 of the slit foam layer 6. The dielectric heat seal equipment operates at a radio frequency of between 17 and 30 MHz and heats the foam from the inside out, much like the operation of a microwave oven. In effect, the vinyl upholstery material is welded to the slit foam layer 6 of the lip 10.

Since the lip 10 is quite narrow, very little plastisol is required, and only the portion of the slit foam layer 6 at the lip 10 is impregnated. Contrasted with impregnating the entire layer 6 with plastisol, this results in substantial saving in plastisol.

This invention is intended to cover all changes and modifications of the example of the invention herein chosen for purposes of the disclosure which do not constitute departures from the spirit and scope of the invention.

What is claimed is:

1. A process for producing a cushion for seating, said process comprising: introducing a liquid reaction mixture into a mold cavity having an upwardly presented open end, the liquid reaction mixture being capable of expanding into a cellular material that has a high degree of flexibility so as to have good cushioning properties, the liquid reaction mixture being in sufficient quantity to substantially fill the entire cavity when expanded; attaching a thin composite backing to a rigid cover that is large enough to completely cover the open end of the cavity, the composite backing including a fabric and thin preformed layer of polyurethane cellular material with the fabric and the preformed cellular material being directly against each other and bonded firmly together such that the fabric extends substantially entirely over one major surface area of the preformed layer of cellular material, the preformed cellular material having open cells and being presented away from the cover so that the fabric is against the cover, the composite backing being attached to the cover at a plurality of locations, some of which are located near the margins of the backing and others of which are spaced substantially inwardly from the margins, so that the backing may be suspended from the cover without sagging away from the cover; placing the cover and the composite backing attached to it over the open top of the cavity such that another major surface area of the preformed cellular material is presented downwardly and exposed to the interior of the cavity, and such that a portion of the backing projects laterally beyond the upper margin of the cavity in the formation of a lip; allowing the reaction mixture to expand within the cavity into a molded cellular material which is sufficiently flexible to have good cushioning properties, with the expansion being sufficient to enable the molded cellular material to come against and partially penetrate the portion of the preformed layer of cellular material that overlies the cavity, but not to penetrate the lip or to reach the fabric, whereby the molded cellular material attaches to the preformed layer of cellular material while the fabric remains completely free of the molded cellular material so as to form a low friction surface across the back of the cushion; and venting the cavity through the open cells of the preformed cellular material as the reaction mixture expands in the cavity.

2. A process according to claim 1 wherein the fabric is in marginal registration with the layer of preformed cellular material.

3. A process according to claim 1 wherein the layer of preformed cellular material is between about 1/16 inches and about ½ inches thick.

4. A process according to claim 1 and further comprising placing an upholstery covering material over the molded cellular material; and stitching the upholstery material to the lip.

5. A process according to claim 1 and further comprising placing an upholstery covering material over the molded cellular material; impregnating the preformed cellular material of the lip with a plastisol which is compatible with the upholstery covering material in the sense that the two can be heat sealed together; and heat sealing the upholstery material to the lip.

6. A process according to claim 1 wherein the cavity is in a mold that has fins which project into the cavity from the base of the cavity, whereby grooves are formed in the cellular material.

7. A process according to claim 1 wherein the cover has mounting pins projected from it and wherein the step of attaching the composite backing to the cover comprises inserting the mounting pins through the layer of preformed cellular material to hold the cellular material in place on the cover plate.

8. A process according to claim 7 wherein the mounting pins have enlarged heads.

* * * * *